(12) United States Patent
Ueno et al.

(10) Patent No.: US 6,239,263 B1
(45) Date of Patent: May 29, 2001

(54) WATER-SOLUBLE AZO COMPOUNDS AND PROCESS FOR THE PREPARATION THEREOF

(75) Inventors: Ryuzo Ueno, Nishinomiya; Masaya Kitayama, Takarazuka; Kenji Minami, Sennan; Masaharu Kittaka, Nishinomiya, all of (JP)

(73) Assignee: Kabushiki Kaisha Ueno Seiyaku Oyo Kenkyujo, Osaka (JP)

( * ) Notice: Subject to any disclaimer, the term of this patent is extended or adjusted under 35 U.S.C. 154(b) by 0 days.

(21) Appl. No.: 09/380,207

(22) PCT Filed: Dec. 21, 1998

(86) PCT No.: PCT/JP98/05755

§ 371 Date: Aug. 26, 1999

§ 102(e) Date: Aug. 26, 1999

(87) PCT Pub. No.: WO99/33925

PCT Pub. Date: Jul. 8, 1999

(30) Foreign Application Priority Data

Dec. 26, 1997 (JP) .................................... 9-359396

(51) Int. Cl.$^7$ .................................... C09B 62/507
(52) U.S. Cl. ........................ 534/641; 534/642; 534/643
(58) Field of Search .................................... 534/641, 642, 534/643

(56) References Cited

U.S. PATENT DOCUMENTS 6,020,470 * 2/2000 Ueno et al. ....................... 534/642 X

* cited by examiner

*Primary Examiner*—Fiona T. Powers
(74) *Attorney, Agent, or Firm*—Sughrue, Mion, Zinn, Macpeak & Seas, PLLC

(57) ABSTRACT

Novel water-soluble azo compounds useful as raw materials for preparing dyes excellent in dyeing properties and fastness and prepared from a coupler consisting of 2-hydroxynaphthalene-3,6-dicarboxylic acid or an ester thereof or an amide derivative of the same and a diazonium compound having a group of the general formula: —B—$(CH_2)_2$- Q or —B'—$(CH_2)_2$-Q' (wherein B and B' are each an electron-attracting group; and Q and Q' are each a group capable of forming a vinyl group through the elimination with an alkali, provided the groups Q and Q' are each bonded at the β-position of the ethyl group).

4 Claims, 8 Drawing Sheets

WATER-SOLUBLE AZO COMPOUNDS AND PROCESS FOR THE PREPARATION THEREOF

TECHNICAL FIELD

The present invention relates to novel water-soluble azo compounds and a process for preparing the same.

BACKGROUND ART

In recent years, novel pigments, dyes and the like have been actively developed in order to provide them with high added values or improved properties. Dyes are color materials having affinities for fibers, i.e., color materials having dyeing abilities, and therefore they are required to have solubility somehow or other. In that context, water-soluble azo compounds have been developed as azo dyes. As specific examples of such water-soluble azo compounds, those prepared from 2-hydroxynaphthalene-6-carboxylic acid (see, for example, the Japanese Patent Publication (Kokai) Nos. S63-309559(1988), Hei 1-215862 (1989) and Hei 1-245060 (1989)) are known.

DISCLOSURE OF THE INVENTION

The present invention is characterized in that it provides water-soluble azo compounds having excellent dyeing properties and fastness (fastness to washing, light, rubbing, perspiration and the like). Further, the present invention aims to provide water-soluble azo compounds of which color and vividness can be regulated by appropriately selecting the substituents on the molecules. Furthermore, the purpose of the present invention is to provide water soluble azo compounds which are excellent in the dye-affinity even in a small amount as compared with a usual one.

The present invention provides novel water-soluble azo compounds prepared using 2-hydroxynaphtdalene-3,6-dicarboxylic acid or an ester or amide derivative thereof as a coupler, and dyes comprising the same, as well as a process for preparing such water-soluble azo compounds.

In particular, the present invention relates to a water-soluble azo compound represented by the general formula [I]:

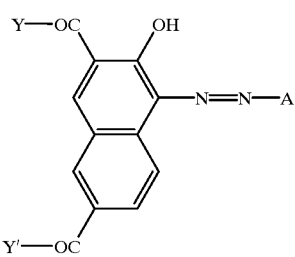

[wherein, Y is —OM, —OR$_1$, or —NH-X, and Y' is —OM', —OR$_1$', or —NH-X', (in which M and M' each represent a hydrogen atom or an alkali metal;

R$_1$ and R$_1$' each represent a group selected from an optionally branched saturated or unsaturated aliphatic hydrocarbon group having 1 to 6 carbon atoms, an optionally substituted cycloalkyl group having 3 to 6 carbon atoms, and an optionally substituted aromatic group; and X and X' each represent an optionally substituted aromatic group or an optionally substituted heterocyclic group having conjugated double bonds;

provided that at least one of Y and Y' represents —OM or —OM';)

A is a group represented by the formula [IV]

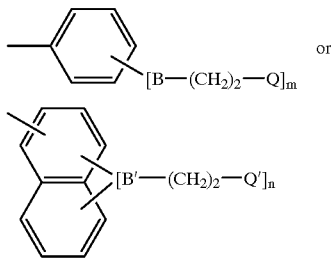

(wherein B and B' represent a group selected from a group consisting of —SO$_2$—, —CO—, — NHSO$_2$—, or —NHCO—, Q and Q' represent a group bonding the ethyl group at the β-position and capable of forming a vinyl group by alkaline decomposition; and m represents an integer 1 or 2, and n represents an integer 1 to 3;)] and to dyes comprising such water-soluble azo compounds.

The present invention further relates to a process for preparing a water-soluble azo compound, which comprises diazotizing an amine represented by the general formula [II]:

$$H_2N\text{-}A \qquad [II]$$

[wherein A is the general formula [IV],

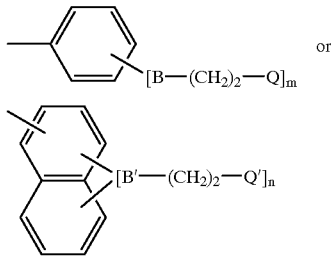

(in which B and B' represent a group selected from a group consisting of —SO$_2$—, —CO—, —NHSO$_2$—, or —NHCO—; and Q and Q' represent a group bonding the ethyl group at the β-position and capable of forming a vinyl group by alkaline decomposition;]

m represents an integer 1 or 2, and n represents an integer 1 to 3;)] and coupling the resulting diazonium compound with a compound represented by the general formula [III]:

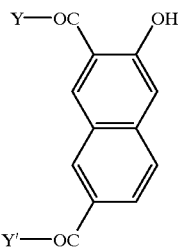

[III]

[wherein Y is —OM, —OR$_1$, or —NH-X, and Y' is —OM', —OR$_1$', or —NH-X', (in which M and M' each represent a hydrogen atom or an alkali metal;

R$_1$ and R$_1$' each represent a group selected from an optionally branched saturated or unsaturated aliphatic hydrocarbon group having 1 to 6 carbon atoms, an optionally substituted cycloalkyl group having 3 to 6 carbon atoms, or an optionally substituted aromatic group; and X and X' each represent an optionally substituted aromatic group or an optionally substituted heterocyclic group having conjugated double bonds;

provided that at least one of Y and Y' represents —OM or —OM';)].

As described above, a coupler used in the present invention (a compound represented by the general formula [III]) is characteristically prepared from 2-bydroxynaphthalene-3,6-carboxylic acid, or an ester or amide derivative thereof. Since such couplers have carboxyl groups or derivatives thereof at both of the 3 and 6 -positions, they can confer superior dyeing properties and fastness (fastness to washing, rubbing, perspiration and the like) on the dyes, compared to hydroxynaphthalenemonocarboxylic acids having a carboxyl group at only one of the 3-and 6-positions. In addition, such couplers allow easier regulation of color and vividness by appropriately selecting the carboxyl group or derivatives thereof. Furthermore only a little amount of them can confer deep dyeing.

The carboxylic acids (wherein M or M' is a hydrogen atom) may be in the form of alkali metal salt (wherein M or M' is an alkali metal). Specific examples of such alkali metal are sodium, potassium, and lithium.

In the case of esters, i.e., when Y is —OR$_1$ or Y' is —OR$_1$', R$_1$ and R$_1$' represent an optionally branched saturated or unsaturated aliphatic hydrocarbon group having 1 to 6 carbon atoms, preferably an optionally branched saturated alkyl having 1 to 4 carbon atoms, and in particular, for example, methyl or ethyl; a cycloalkyl having 3 to 6 carbon atoms, or an aromatic group, preferably a phenyl, benzyl, or phenacyl group; and the cycloalkyl or aromatic group contained in such group may have also substituent(s). Examples of such substituents are halogen atoms, nitro, lower alkyl, lower alkoxy, cyano, phenyl, morpholino, phenoxy, amide, carboxyl, and sulfo groups.

Amides, i.e., those compounds wherein Y is —NH-X or Y' is —NH-X', may be obtained by converting the acid to acid chloride in the usual manner using, for example, thionyl chloride in a solvent such as xylene or sulfolane and then reacting the product with an amine. Alternatively, the same may also be obtained by directly reacting the acid with an amine using phosphorus trichiloride, dicyclohexylcarbodiimide or the like.

Examples of amine, i.e., those compounds which constitute —NH-X or —NH-X', may include optionally substituted aromatic amino compounds such as aniline (X or X' is a phenyl group), aminonaphthalene (X or X' is a naphthyl group), aminoanthracene (X or X' is an antihyl group), aminopyrene (X or X' is a pyrenyl group), aminofluorene (X or X' is a fluorenyl group) and aminoanthaquinone (X or X' is an anthraquinonyl group), optionally substituted heterocyclic amio compounds having conjugated double bonds such as aminobenzimidazolone (X or X' is a benzimidazolonyl group), aminocarbazole (X or X' is a carbanoly) group), ammo pyridine (X or X' is a pyridyl group), aminothiazole (X or X' is a ihiazolyl group), aminobenzothiazole (X or X' is a benzothiazolyl group), and aminoimidazole (X or X' is an imidazolyl group), as well as aminoindole, aminothiophene, aminophcnothiazine, aminoacridine, aminoquinoline and the like. Examples of substituent on such compounds include halogen atoms, nitro, sulfo, lower alkyl, lower alkoxy, cyano, phenyl, morpholino, phenoxy, carboxyl, amide (e.g., phenylairnocarbonyl) groups, and sulfonyl (e.g., sulfatoethylsulfonyl), and such phenoxy or amide group may have additional substituent(s). Examples of such additional substituent are halogen atoms, lower alkyl, lower alkoxy, alkylaminosulfonyl, and cyano groups.

A water-soluble azo compound of the present invention may be obtained by diazotizing an amine represented by the general formula [II] using sodium nitrite or other agents, and coupling the diazonium compound thus obtained with the above 2-hydroxynaphthalene-3,6-dicarboxylic acid or a derivative thereof (such as a carboxyamide or an ester).

The amines of the general formula [II] have a substituent which is represented by —B—(CH$_2$)$_2$-Q on the phenyl group of the aniline, or a substituent which is represented by —B'—(CH$_2$)$_2$-Q' on the naphthyl group of the naphthylline. The number (m) of the substituents of —B—(CH$_2$)$_2$-Q on the phenyl group is 1 or 2, and the number (n) of the substituents of —B'—(CH$_2$)$_2$-Q' on the naphthyl group is 1, 2 or 3.

B and B' represent an electron attractive group, especially a group selected from a group consisting of a sulfonyl group (—SO$_2$—), a carbonyl group (—CO—), a sulfonylamino group (—NHSO$_2$—) or a carbonylamino group (—NHCO—), and preferably a sulfonyl group.

Q and Q' represent a group bonding the ethyl group at the β-position and capable of forming a vinyl group by the alkaline decomposition, for example, an alkanoyloxy group having 2 to 5 carbon atoms such as an acetyloxy group, an aroyloxy group (e.g., a benzoyloxy group (—OCOC$_6$H$_5$), a sulfobenzoyloxy group (—OCOC$_6$H$_4$SO$_3$H) or a carboxybenzoyloxy group (—OCOC$_6$H$_4$COOH)), a dialkylamino group having alkyl residues having 1 to 4 carbon atoms such as a dimethylamino group and a diethylamino group, a trialkylammonium group having alkyl residues having 1to 4 carbon atoms such as a trimethylammonium group, an alkylsulfonyloxy group having alkyl residues having 1to 4 carbon atoms, a phosphato group (—OPO$_3$H$_2$), a thiosulfato group (—S—SO$_3$H) or a sulfato group (—O—SO$_3$H), a chlorine atom, a bromine atom, and preferably a sulfato group.

As described below, Q is important as a protecting group of an ethyl group. When the azo compounds of the present invention arm solid, Q contributes to their stability, and when their aqueous solution is alkaline on dyeing, Q is eliminated from an ethyl group by hydrolysis and therefore a vinyl group is formed. This vinyl group is activated by the influence of the vicinal electron attractive group B and reacts and binds with the hydroxyl group of the fiber. With respect to Q' and B', it is the same.

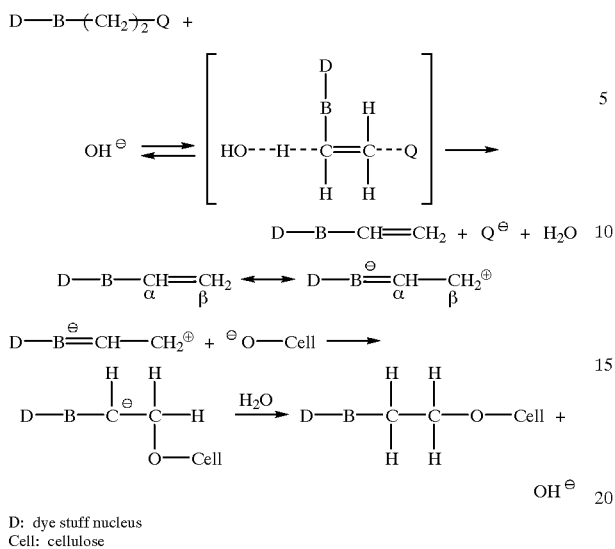

D: dye stuff nucleus
Cell: cellulose

The method for preparing a diazoniun compound from an amine is not specifically restricted. The general method of diazotizing an amine with, for example, sodium nitrite may suitably be used.

The process in which the diazoniun compound is further coupled with the above-described 2-hydroxynaphthalcne-3,-dicarboxylic acid or a derivative thereof (for example, a carboxyamide or an ester) may also be achieved in the usual manner.

Water-soluble azo compounds of the present invention may exist in the form of acid or alkali metal salt. Typically, they are isolated from the reaction mixtures as sodium or potassium salts using sodium chloride, potassium chloride or the like. They are usually used as such alkali metal salts in dyeing.

Water-soluble azo compounds of the present invention may be used as dyes for fibers and other materials.

BEST MODE FOR CARRYING OUT THE INVENTION

The present invention is further illustrated by following Examples.

All the values for absorption maximum ($\lambda_{max}$) reported in Examples were measured using an aqueous solution of the compound isolated as an alkali metal salt.

EXAMPLE 1

Into the solution of 2.66 g of 4-(β-sulfatoethylsulfonyl) aniline 6.6 g of $H_2SO_4$ and 150 g of water prepared according to a usual manner, 1.04 g of sodium nitrite and 10 g of water were added dropwise with ice-cooling to achieve diazotization. This diazotization mixture was added dropwise into an aqueous coupler solution containing 30 g of water, 16.8 g of 10% aqueous solution of $NaHCO_3$, and 2.32 g of 2-hydroxynaphthalene-3,6-dicarboxylic acid for 30 minutes at 0 to 5° C. to carry out the coupling reaction in the usual manner. Stirring was continued for several hours at 15° C. until the coupling reaction completed. During this reaction, the pH was maintained at 4 to 6 with 10%, aqueous solution of $NaHCO_3$. The resulting monoazo compound of formula (1) was isolated by salting out with sodium chloride and filtration to obtain 2.65 g of red-powdery crystals including sodium chloride.

This compound has excellent fiber-reactive dye properties, and thereby dyed cellulose fiber materials, for example cotton, by the usual dyeing procedures in deep reddish orange exhibiting high fastness to chlorine, light, alkaline perspiration, and rubbing.

Figure 1:
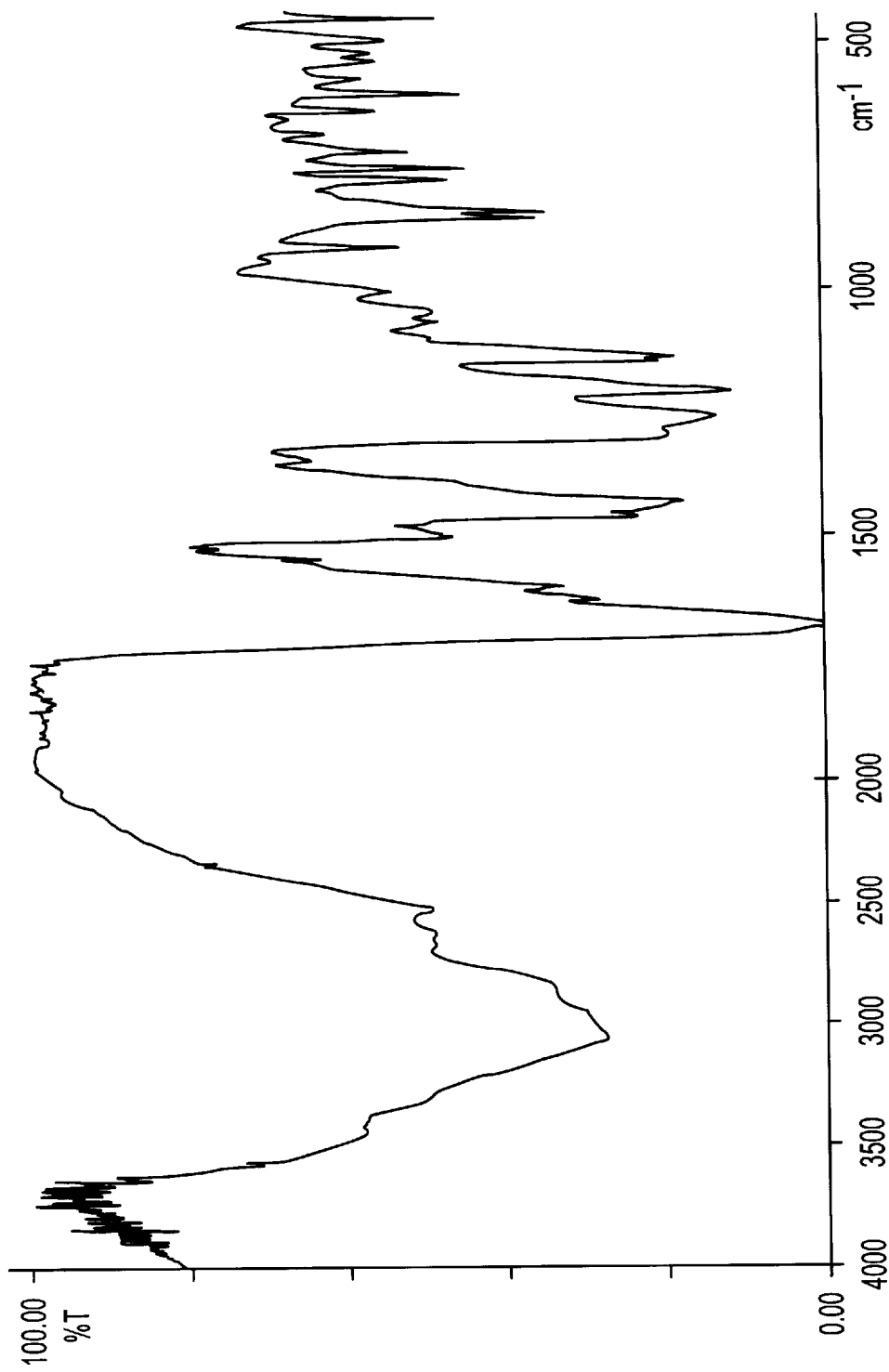
FIG. 1 is an infrared absorption spectrum of the azo compound obtained in Example 1.

An infrared absorption spectrum (the KBr method) of the red powdery crystals thus obtained is shown in FIG. 1.

(1)

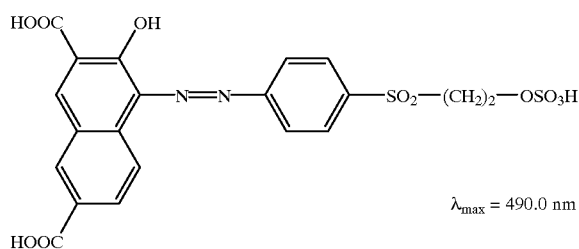

$\lambda_{max}$ = 490.0 nm

The methods of dyeing and testing in which the red powdery crystals obtained in Example 1 were used are illustrated hereafter, and the results of evaluations are shown in Table 1.

TABLE 1

(Evaluation results)

| chlorine fastness 20 ppm | light fastness 10 hr. | light fastness 20 hr. | alkaline perspiration fastness 1: discoloration of dyed cloth 2: staining of cotton cloth | rub fastness 1: dry 2: wet |
|---|---|---|---|---|
| 5 | 4 | 4 | 1: 4<br>2: 4 | 1: 5<br>2: 4 |

Dyeing

Dyeing was cried out on unmercerized cotton cloth, while the dyeing concentration was regulated so as to conform with the standard color sample prescribed in JIS L 0802. The dyeing conditions were as follows:

| | |
|---|---|
| bath ratio | 15:1 (dyebath:cotton cloth) |
| dyeing conditions | at 60° C. for 60 minutes |
| dyeing assistants | mirabilite 70 g/l |
| | soda ash 40 g/l |

| | |
|---|---|
| washing | after washed with water, neutralized with acetic acid and then washed with hot water |
| soaping | nonionic surfactant 2 g/l boiled for 10 minutes at a bath ratio of 15:1 (activator solution:cotton cloth). |

Test for assessing chlorine fastness

[Treating conditions]

A test sample is immersed in a chlorine solution having an effective concentration of 20 ppm at a bath ratio of 100:1 for 4 hours at 27°C.

[Evaluation]

The test sample is evaluated on a one-to-five scale using a grey scale for assessing discoloration which complies JIS L 0804.

Test for assessing light fastness

After 10 and 20 hours irradiation with a xenon lump, discoloration is evaluated on a one-to-eight scale using a blue scale which complies JIS L 0841.

Resist to alkaline perspiration

A composite test piece consisting of a piece of dyed cloth sandwiched between a piece of cotton cloth and a piece of nylon cloth both undyed is put into a container of an alkaline artificial perspiration solution (bath ratio=50:1) to wet it completely, and immersed therein for 30 minutes at room temperature. The composite test piece is pressed and moved at times in order to thoroughly permeate it with the test solution.

The test solution is then drained, and the composite test piece is squeezed by pinching it between two glass rods until the excess of test solution no longer drips.

The composite test piece is sandwiched between two glass or hard plastic sheets, set on a perspiration tester, and subjected to a force of about 45 kgf (44.1 N). The perspiration tester is then put in an oven so that the composite test piece set on the perspiration tester is maintained perpendicular to the bottom of the oven. After retaining in the oven at 37±2° C. for 4 hours, the composite test piece is removed ftom the perspiration tester. The test piece and the two pieces of white cloth attached thereto (unmercerized cotton cloth and nylon cloth) are separated from each other, and dried in air at 60° C. or below. (This procedure is carried out in conformity with JIS L 0848.)

| [Composition of alkaline artificial perspiration solution] | |
|---|---|
| L-histidine hydrochloride (monohydrate) | 0.5 g |
| sodium chloride | 5 g |
| disodium hydrogenphosphate (dodecahydrate) | 5 g | bring to a total volume of one liter at pH 8 by adding about 25 ml of N/10aqueous sodium hydroxide and an appropriate amount of distilled water.

[Evaluation]

Change in color of the cloth originally dyed is evaluated on a one-to-five scale using a grey scale for assessing change in color which complies JIS L 0804. Staining on each of the attached white cloths is evaluated on a one-to-five scale using a grey scale for assessing which complies JIS L 0805.

Fastness to rubbing

The tests are carried out under dry and wet conditions, and migration of the dye onto white cloth from the dyed cloth due to rubbing is evaluated on a one-to-five scale using a grey scale for assessing staining which complies JIS L 0805. (These tests are carried out in conformity with JIS L 0849.)

In all the evaluations described above, higher values indicate superior properties.

EXAMPLE 2

A monoazo compound represented by formula (2) was prepared as described in Example 1 with the exceptions that 3.07 g of 2-hydroxy-3-phenylaninocarbonyl-6-hydroxycarbonylnaphthalene was substituted for 2.32 g of 2-hydroxynaphthalene-3,6-dicarboxylic acid and that 8 g of 10% aqueous solution of NaOH was substituted for 16.8 g of aqueous solution of 10% $NaNCO_3$ used in preparation of the aqueous coupler solution. The product was isolated by salting out with sodium chloride and filtration to yield 4.06 g of red powdery crystals including sodium chloride.

This compound has excellent fiber-reactive dye properties, and thereby dyed cellulose fiber materials, for example cotton, by the usual dyeing procedures in deep yellowish red exhibiting high fastness to chlorine, light, alkaline perspiration, and rubbing.

Figure 2:
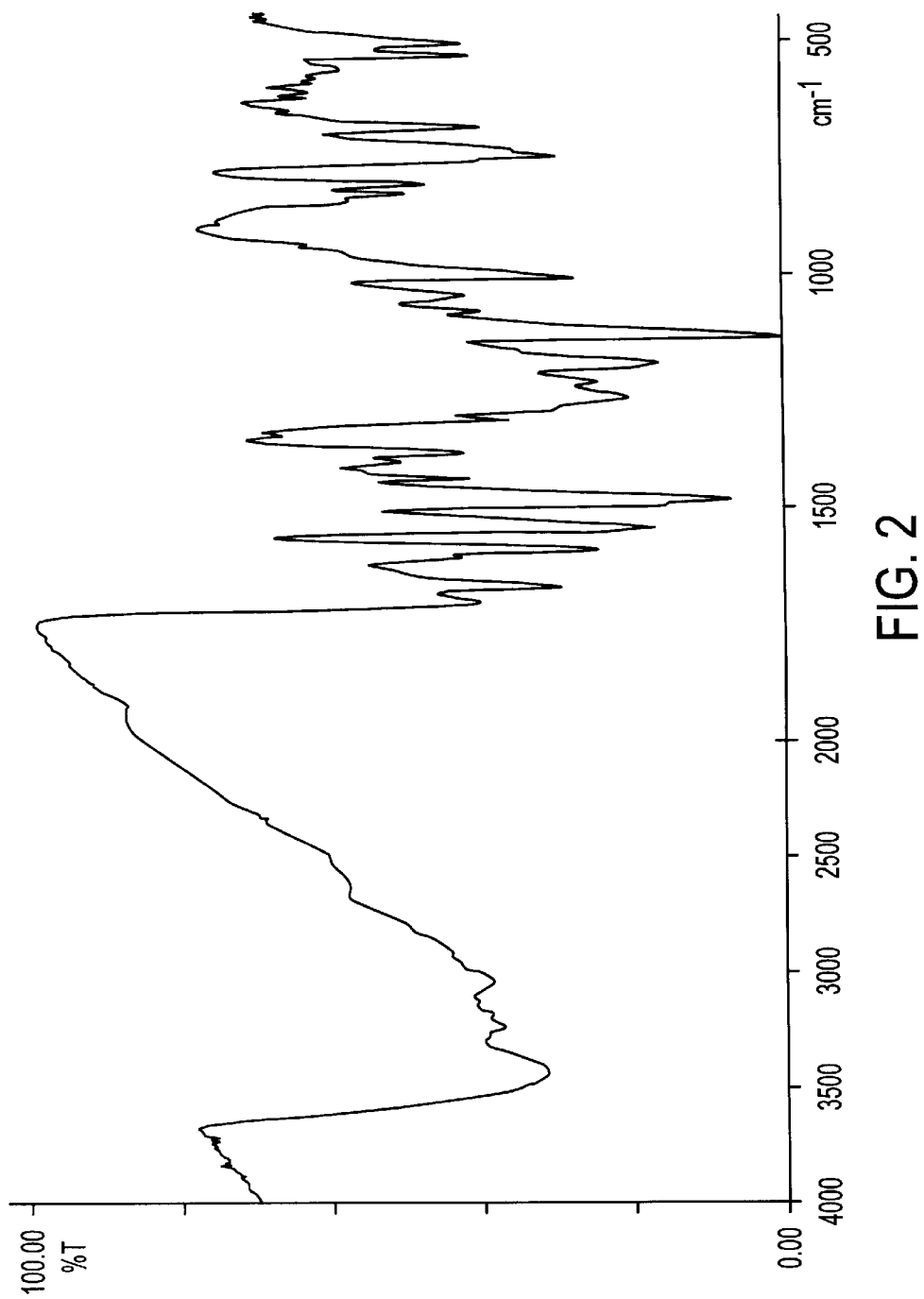
FIG. 2 is an infrared absorption spectrum of the azo compound obtained in Example 2.

An infrared absorption spectrum (the KBr method) of the red powdery crystals thus obtained is shown in FIG. 2.

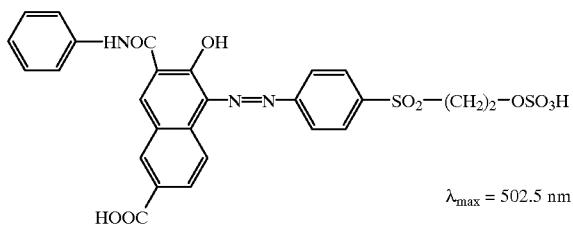

(2)

$\lambda_{max} = 502.5$ nm

Using the redish power of the Example 2, soadiun salts of the reference compounds of the Comparative Examples 1 and 2, the dyeing was carried out respectively adjusting the concentration of each dyestuff (% by weight of sodium salts used per cotton cloth weight) so as to conform the color deepness with the standard color sample prescribed in JIS L0802.

The concentrations are shown in Table 2.

Example 2

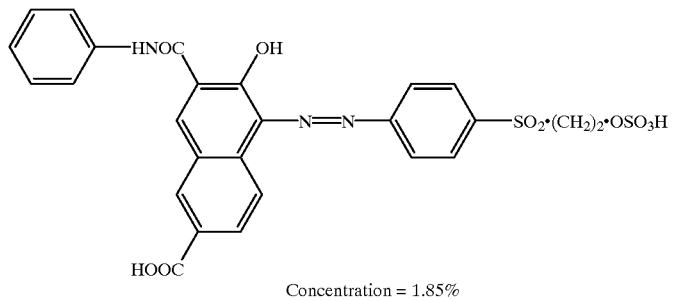

Concentration = 1.85%

Comparative Example 1
Japanese Patent Publication Hei 06-102759

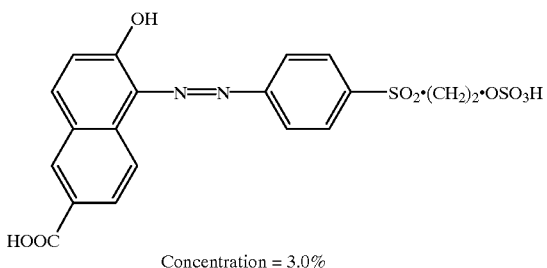

Concentration = 3.0%

Comparative Example 2
C.I. Reactive Orange 16

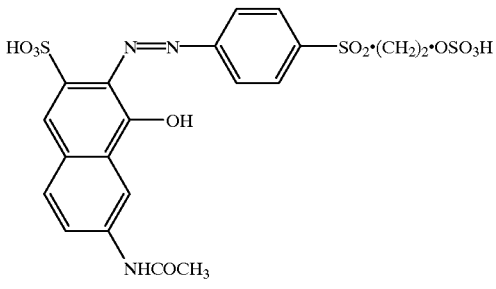

Concentration = 4.0%

EXAMPLE 3

A monoazo compound represented by formula (3) was prepared as described in Example 1 with the exceptions that 3.07 g of 2-hydroxy-3-hydroxycarbonyl-6-phenylaminocarbonylnaphthalene was substituted for 2.32 g of 2-bydroxynaphthalene-3,6-dicarboxylic acid, that 8 g of 10% aqueous solution of NaOH was substituted for 16.8 g of 10% aqueous solution of $NaHCO_3$ used in preparation of the aqueous coupler solution, and that 60 g of 50% aqueous methanol solution was used instead of 30 g of water. The product was isolated by salting out with sodium chloride and filtration to yield 4.23 g of red powdery crystals including sodium chloride.

This compound has excellent fiber-reactive dye properties, and thereby dyed cellulose fiber materials, for example cotton, by the usual dyeing procedures in deep yellowish red exhibiting high fastness to chlorine, light, alkaline perspiration, and rubbing.

Figure 3:
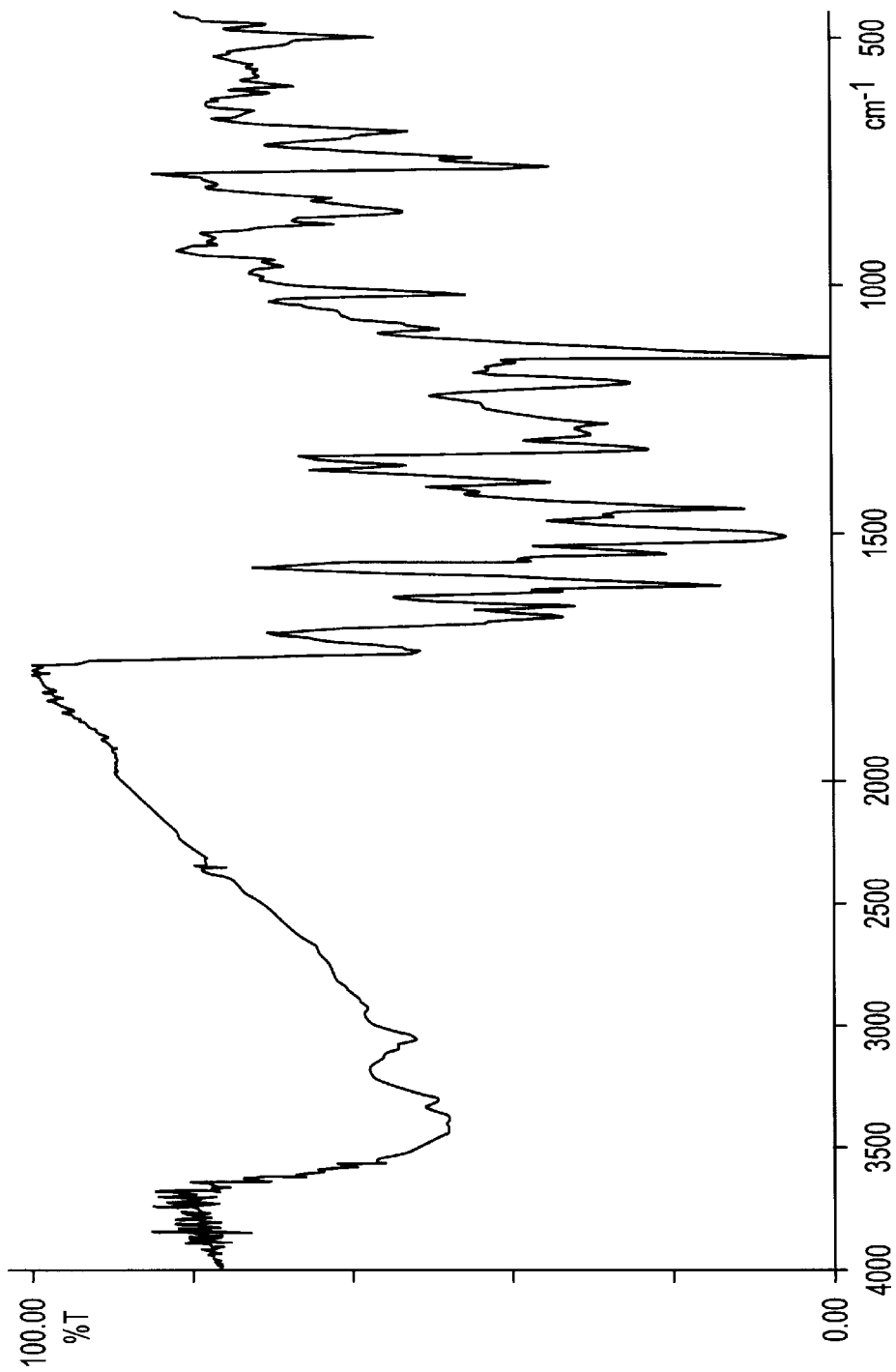
FIG. 3 is an infrared absorption spectrum of the azo compound obtained in Example 3.

An infrared absorption spectrum (the KBr method) of the red powdery crystals thus obtained is shown in FIG. 3.

(3)

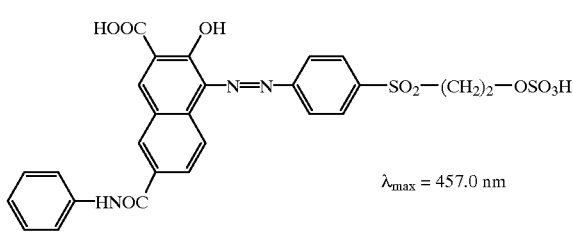

$\lambda_{max}$ = 457.0 nm

EXAMPLE 4

A monoazo compound represented by formula (4) was prepared as described in Example 1 with the exceptions that 3.50 g of 2-hydroxy-6-hydroxycarbonyl-3-(1-naphthyl)aminocarbonylnaphthalene was substituted for 2.32 g of 2-hydroxynaphthalene-3,6-dicarboxylic acid and that 20 g of 10% aqueous solution of NaOH was substituted for 16.8 g of 10% aqueous solution of NaHCO$_3$ used in preparation of the aqueous coupler solution The product was isolated by salting out with sodium chloride and filtration to yield 6.20 g of red powdery crystals including sodium chloride.

This compound has excellent fiber-reactive dye properties, and thereby dyed cellulose fiber materials, for example cotton, by the usual dyeing procedures in deep yellowish orange exhibiting high fastness to chlorine, light, alkaline perspiration, and rubbing.

Figure 4:
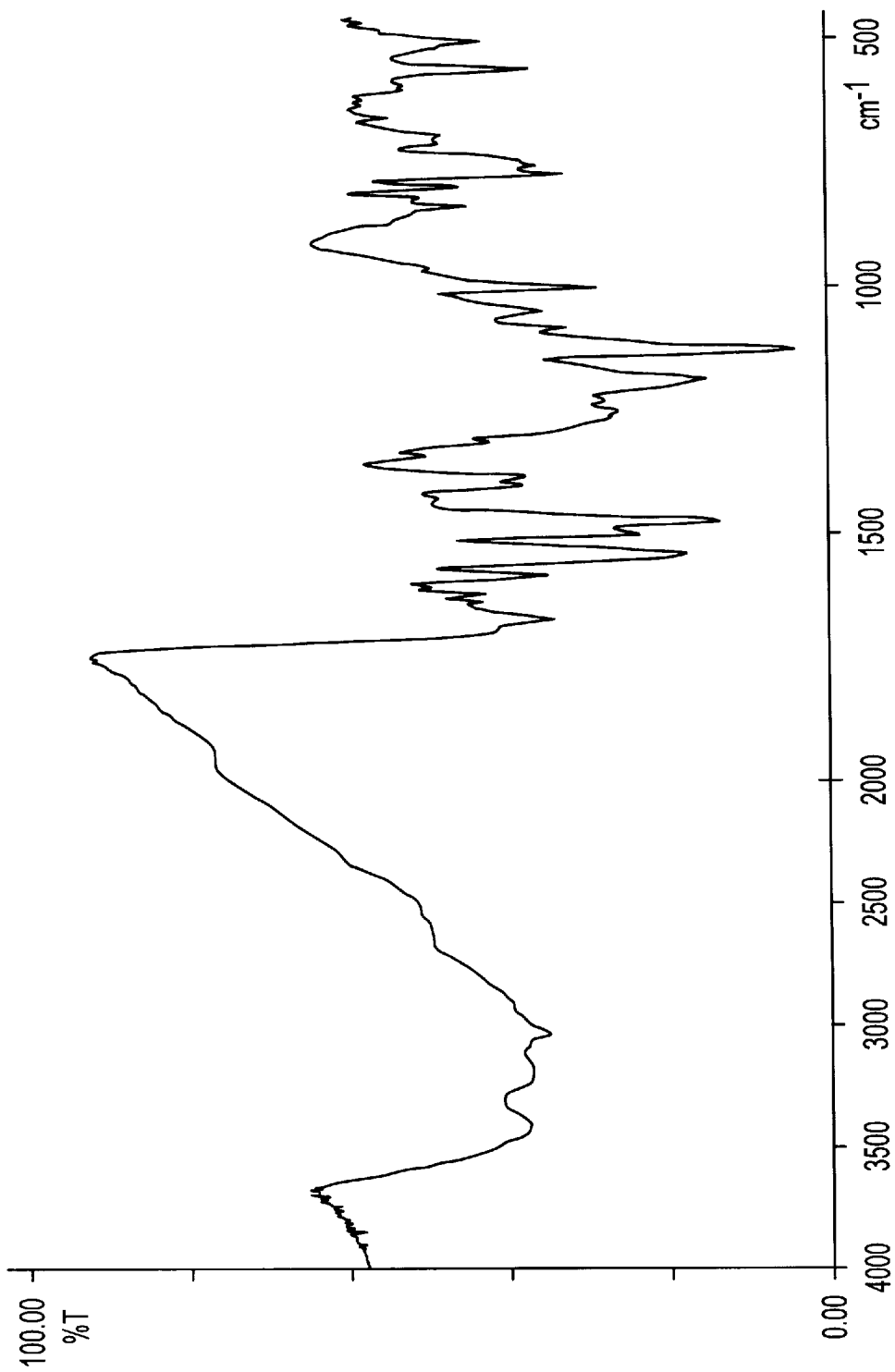
FIG. 4 is an infrared absorption spectrum of the azo compound obtained in Example 4.

An infrared absorption spectrum (the KBr method) of the red powdery crystals thus obtained is shown in FIG. 4.

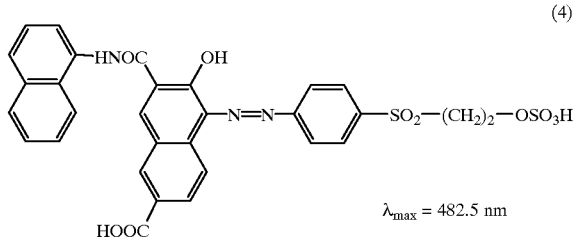

(4)

$\lambda_{max} = 482.5$ nm

Example 5

A monoazo compound represented by formula (5) was prepared as described in Example 1 with the exceptions that 3.92 g of 2-hydroxy-3-(4-diphenylether)aminocarbonyl-6-hydroxycarbonylnaphthalene was substituted for 2.32 g of 2-hydroxynaphthalene-3,6-dicarboxylic acid and that 20 g of 10% aqueous solution of NaOH was substituted for 16.8 g of 10% aqueous solution of NaHCO$_3$ used in preparation of the aqueous coupler solution. The product was isolated by salting out with sodium chloride and filtration to yield 5.37 g of red powdery crystals including sodium chloride.

This compound has excellent fiber-reactive dye properties, and thereby dyed cellulose fiber materials, for example cotton, by the usual dyeing procedures in deep yellowish orange exhibiting high fastness to chlorine, light, alkaline perspiration, and rubbing.

Figure 5:
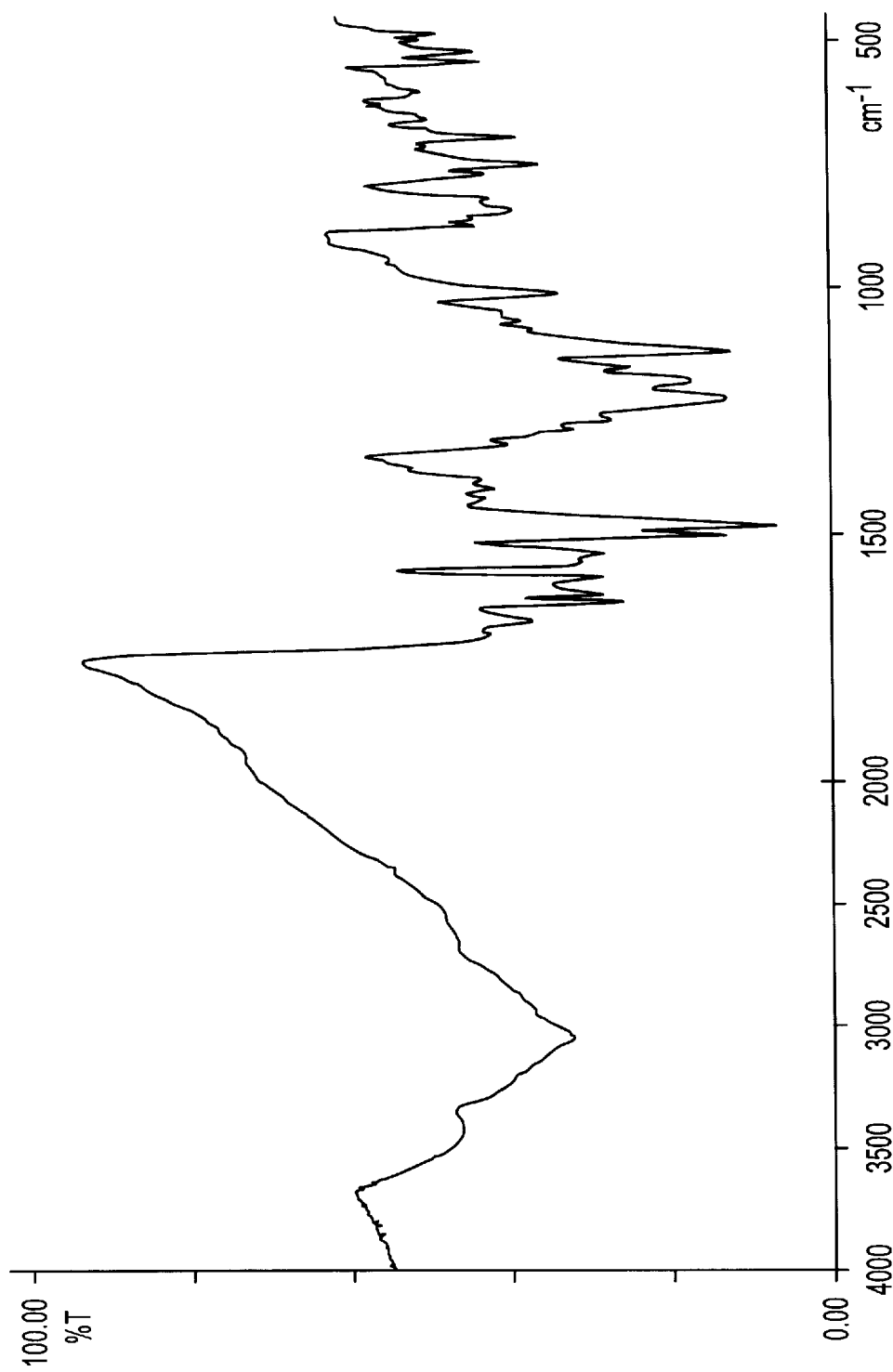
FIG. 5 is an infrared absorption spectrum of the azo compound obtained in Example 5.

An infrared absorption spectrum (the KBr method) of the red powdery crystals thus obtained is shown in FIG. 5.

EXAMPLE 6

A monoazo compound represented by formula (6) was prepared as described in Example 1 with the exceptions that 4.38 g of 2-hydroxy-3-(2-anthraquinolyl)aminocarbonyl-6-hydroxycarbonylnapthalene was substituted for 2.32 g of 2-hydroxynaphihalene-3,6-dicarboxylic acid and that the aqueous solution of 20 g of 10% aqueous solution of NaOH and 100 g of N-methyl-2-pyrrolidone was substituted for 16.8 g of 10% aqueous solution of NaHCO$_3$ used in preparation of the aqueous coupler solution. The product was isolated by salting out with sodium chloride and filtration to yield 6.58 g of red powdery crystals including sodium chloride.

This compound has excellent fiber-reactive dye properties, and thereby dyed cellulose fiber materials, for example cotton, by the usual dyeing procedures in deep yellowish brown exhibiting high fastness to chlorine, light, alkaline perspiration, and rubbing.

Figure 6:
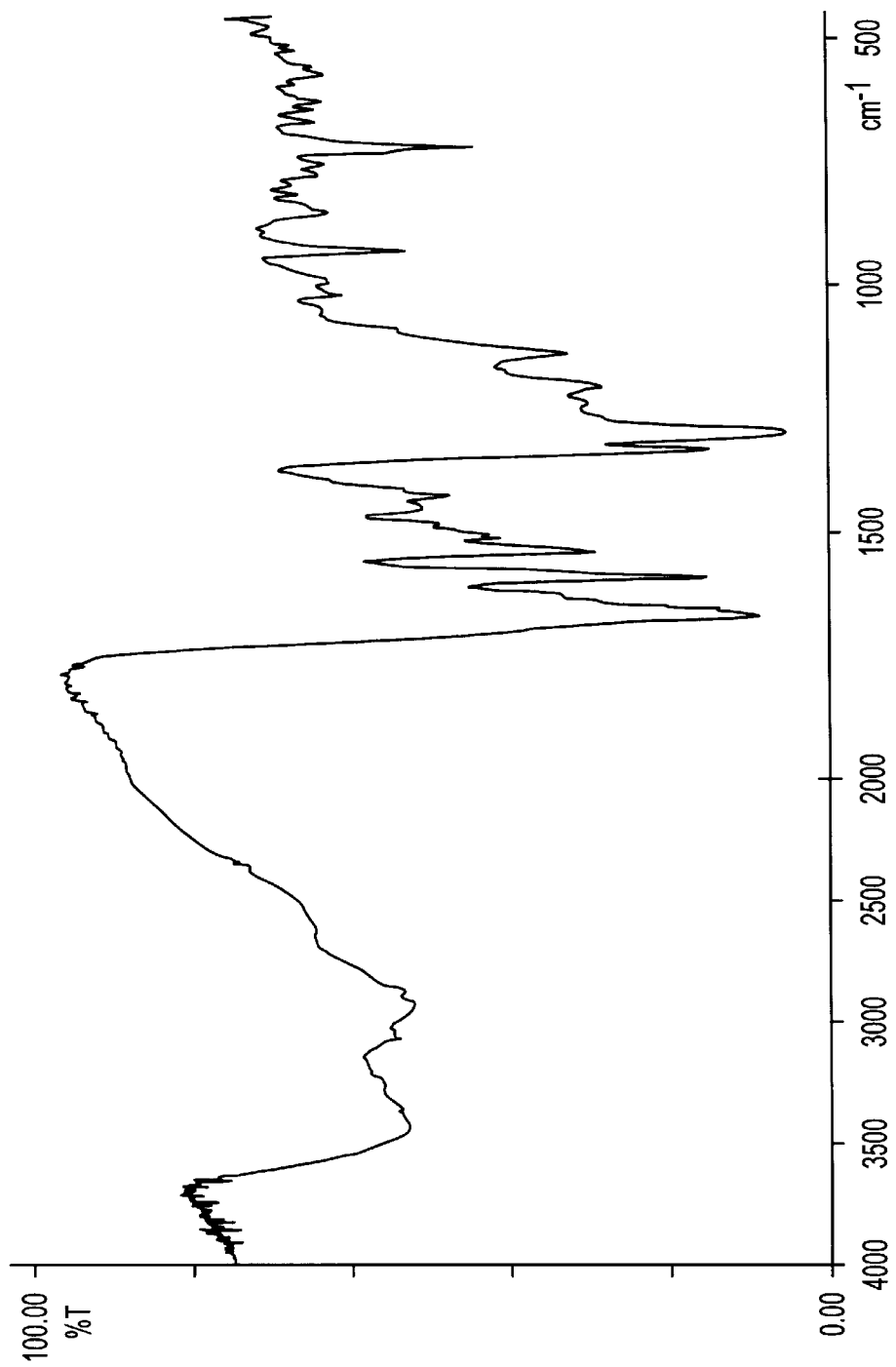
FIG. 6 is an infrared absorption spectrum of the azo compound obtained in Example 6.

An infrared absorption spectrum (the KBr method) of the red powdery crystals thus obtained is shown in FIG. 6.

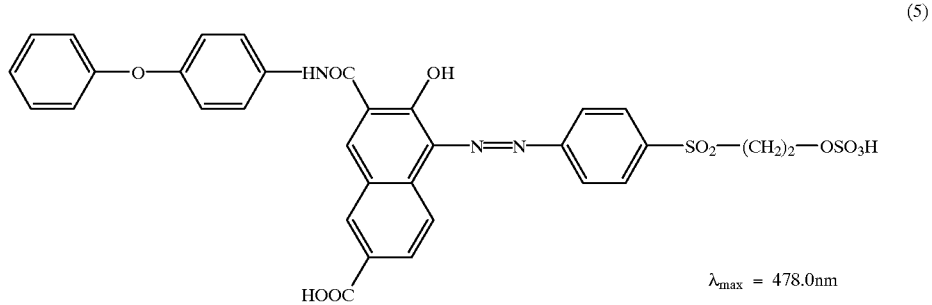

(5)

$\lambda_{max} = 478.0$ nm

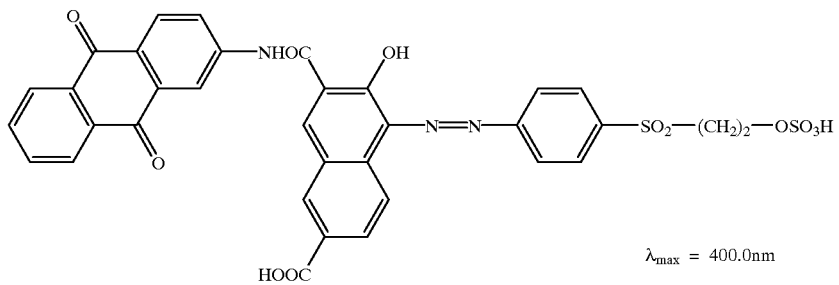

(6)

$\lambda_{max}$ = 400.0nm

EXAMPLE 7

A monoazo compound represented by formula (7) was prepared as described in Example 1 with the exceptions that 3.01 g of 2-hydroxy-6hydroxycarbonyl-3-(2-pyridyl) aminocarbonylnaphthalene was substituted for 2.32 g of 2-hydroxynaphthalene-3,6-dicarboxylic acid and that the aqueous solution of 60 g of 10% aqueous solution of NaOH and 20 g of N-methyl-2-pyrrolidone was substituted for 16.8 g of 10% aqueous solution of $NaHCO_3$ used in preparation of the aqueous coupler solution The product was isolated by salting out with sodium chloride and filtration to yield 7.04 g of red powdery crystals including sodium chloride.

This compound has excellent fiber-reactive dye properties, and thereby dyed cellulose fiber materials, for example cotton, by the usual dyeing procedures in deep brownish orange exhibiting high fastness to chlorine, light, alkaline perspiration, and rubbing.

Figure 7:
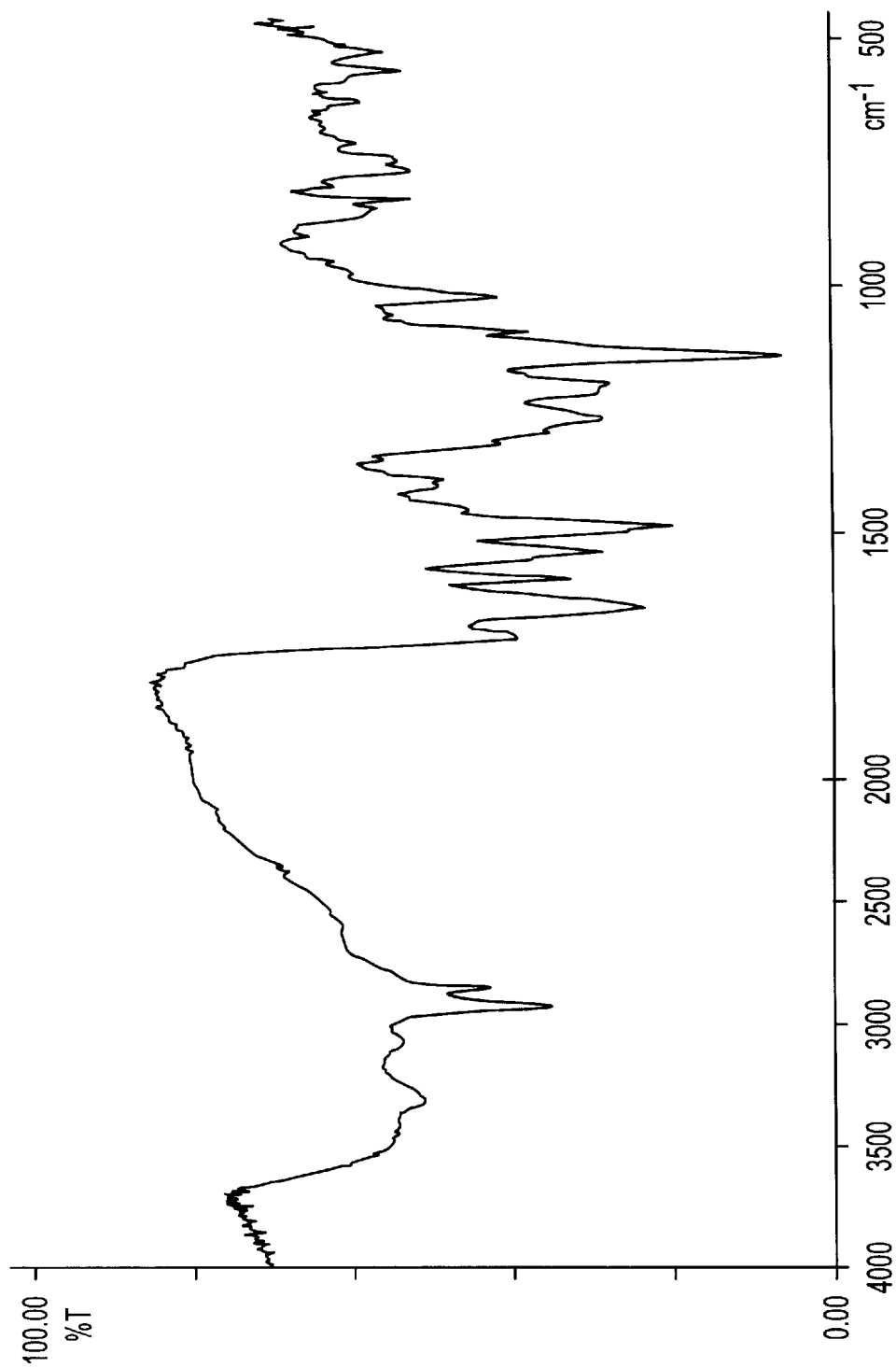
FIG. 7 is an infrared absorption spectrum of the azo compound obtained in Example 7.

An infrared absorption spectrum (the KBr method) of the red powdery crystals thus obtained is shown in FIG. 7.

3.57 g of 2-hydroxy-6-hydroxycarbonyl-3-benzothiazolylaminocarbonylnaphdthalene was substituted for 2.32 g of 2-hydroxynaphthalene-3,6-dicarboxylic acid and that the aqueous solution of 60 g of 10% aqueous solution of NaOH and 20 g of N-methyl-2-pyrrolidone was substituted for 16.8 g of 10% aqueous solution of $NaHCO_3$ used in preparation of the aqueous coupler solution. The product was isolated by salting out with sodium chloride and filtration to yield 3.74 g of red powdery crystals including sodium chloride.

This compound has excellent fiber-reactive dye properties, and thereby dyed cellulose fiber materials, for example cotton, by the usual dyeing procedures in deep brownish orange exhibiting high fastness to chlorine, light, alkaline perspiration, and rubbing.

Figure 8:
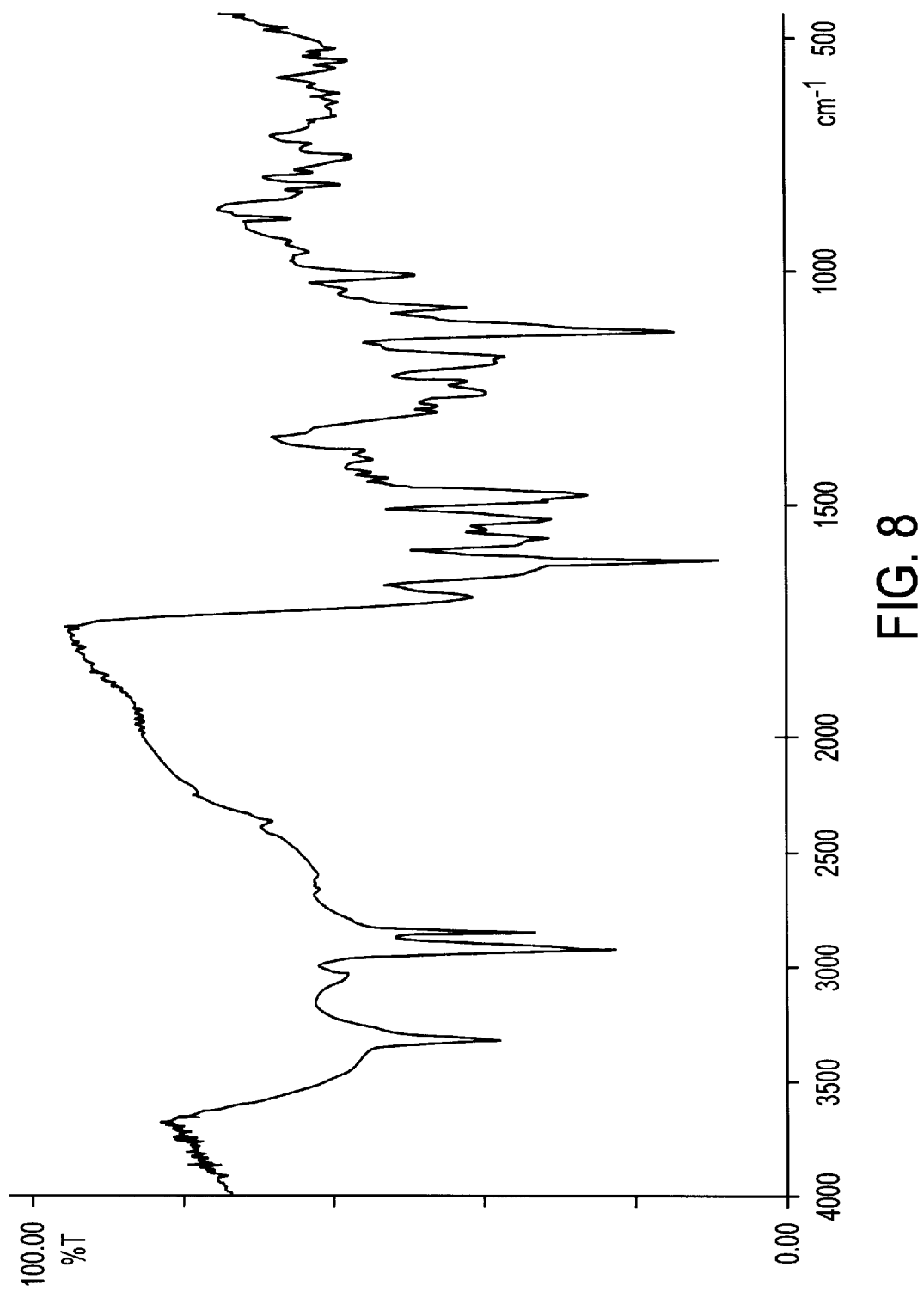
FIG. 8 is an infrared absorption spectrum of the azo compound obtained in Example 8.

An infrared absorption spectrum (the KBr method) of the red powdery crystals thus obtained is shown in FIG. 8.

(7)

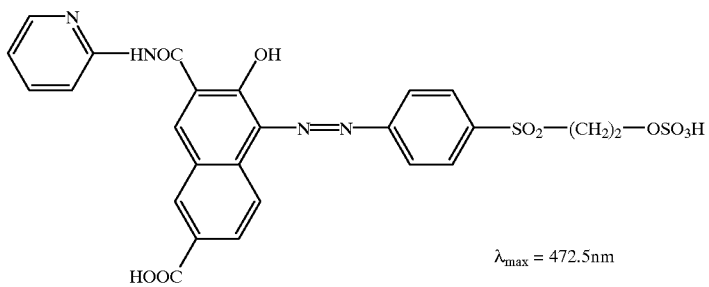

$\lambda_{max}$ = 472.5nm

EXAMPLE 8

A monoazo compound represented by formula (8) was prepared as described in Example 1 with the exceptions that (8)

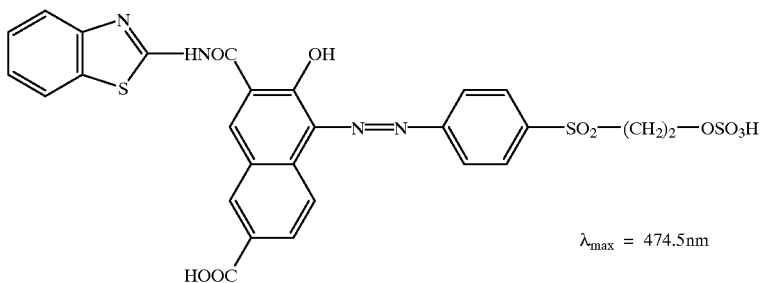

$\lambda_{max} = 474.5\text{nm}$

INDUSTRIAL APPLICABILITY

By using as couplers 2-hydroxynaphthalenedcaiboxylic acids having carboxyl groups or derivatives of at both of the 3- and 6-positions, water-soluble azo compounds can be obtained which have superior dyeing properties and fastness (fastness to washing, rubbing) perspiration and the like) compared to those obtained by using as couplers 2-hydroxynaphthalenemonocarboxylic acids having a carboxyl group only one of the 3- and 6-positions. In addition, such couplers allow easier regulation of color and vividness by appropriately selecting the carboxyl group or derivatives thereof. Furthermore only a little amount ot them can confer deep color.

What is claimed is:

1. A water-soluble azo compound represented by the general formula (I):

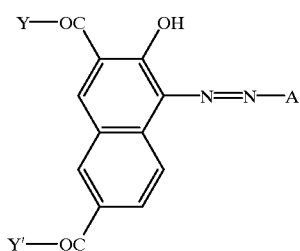

wherein, Y is —OM, —OR$_1$, or —NH-X, and Y' is —OM', —OR$_1$', or —NH-X', (in which M and M' each represent a hydrogen atom or an alkali metal;

R$_1$ and R$_1$' each represent a group selected from an optionally branched saturated or unsaturated aliphatic hydrocarbon group having 1 to 6 carbon atoms, an optionally substituted cycloalkyl group having 3 to 6 carbon atoms, and an optionally substituted aromatic group; and X and X' each represent an optionally substituted aromatic group or an optionally substituted heterocyclic group having conjugated double bonds;

provided that at least one of Y and Y' represents —OM or —OM';)

A is a group represented by formula (IV)

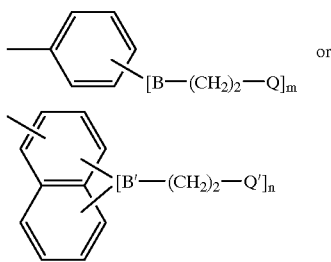

(in which B and B' represent a group selected from a group consisting of —SO$_2$—, —CO—, —NHSO$_2$— and —NHCO—; and Q and Q' represent a group binding an ethyl group at β-position and capable of forming a vinyl group by alkaline decomposition, m represents an integer 1 or 2, and n represents an integer 1 to 3).

2. A process for preparing a water-soluble azo compound of claim 1 which comprises diazotizing an amine represented by the general formula (II)

$$H_2N\text{-}A \qquad (II)$$

wherein A is a group represented by a general formula (IV),

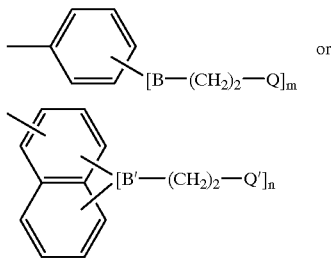

(in which B and B' represent a proup selected from a group consisting of —SO$_2$—, —CO—, —NHSO$_2$—and —NHCO—; and Q and Q' represent a group binding an ethyl group at β-position and capable of forming a vinyl group by alkaline decomposition;

m represents an integer 1 or 2, and n represents an integer 1 to 3;)

and coupling a resulting diazoniun compound with a compound represented by a general formula (III)

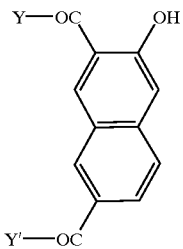
(III)

wherein Y is —OM, —OR$_1$—, or —NH-X, and Y' is —OM, —OR$_1$', or —NH-X', (in which M and M' each represent a hydrogen atom or an alkali metal;

R$_1$ and R$_1$' each represent a group selected from an optionally branched saturated or unsaturated aliphatic hydrocarbon group having 1 to 6 carbon atoms, an optionally substituted cycloalkyl group having 3 to 6 carbon atoms, or an optionally substituted aromatic group; and X and X' each represent an optionally substituted aromatic group or an optionally substituted heterocyclic group having conjugated double bonds;

provided that at least one of Y and Y' represents —OM or —OM').

3. An aqueous dye bath comprising a water-soluble azo compound of claim 1.

4. A process for dyeing fibers which comprises bringing the fibers into contact with a dyeing effective amount of a compound of claim 1.

* * * * *